D. R. FRASER.
PISTON PACKING.
No. 35,439.  Patented June 3, 1862.
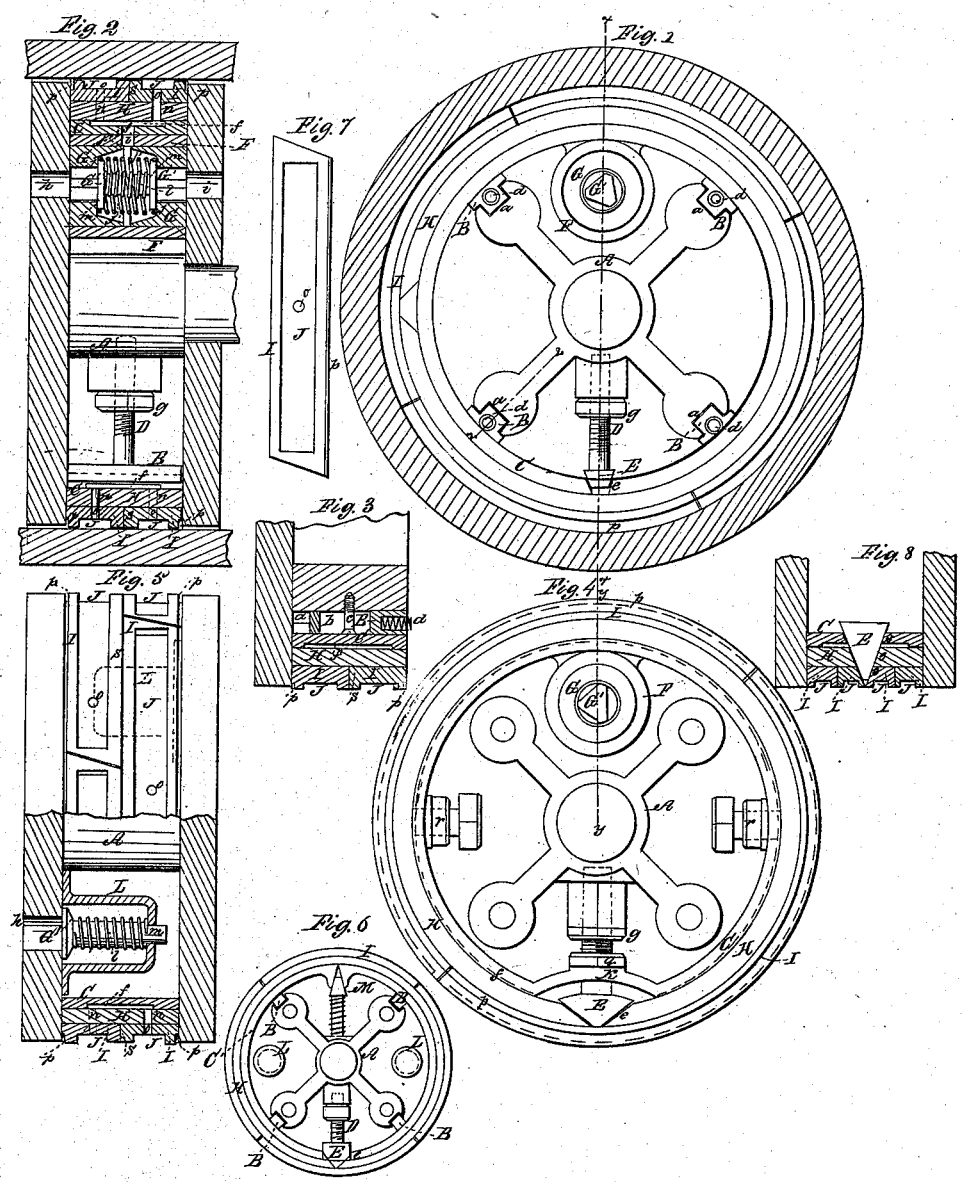

UNITED STATES PATENT OFFICE.

D. R. FRASER, OF CHICAGO, ILLINOIS.

PISTON-PACKING.

Specification of Letters Patent No. 35,439, dated June 3, 1862.

*To all whom it may concern:*

Be it known that I, D. R. FRASER, of Chicago, in the county of Cook and State of Illinois, have invented a new and useful Improvement in Packing Pistons of Steam-Engines; and I do hereby declare that the following is a full, clear, and exact description of the same, reference being had to the accompanying drawings, forming part of this specification, in which—

Figure 1 is an end view of a piston with follower removed. The piston is shown within an engine cylinder which is sectioned transversely. Fig. 2 is a vertical central section of the same in the line $x$ $x$ of Fig. 1.

Figs. 3, 4, 5, 6, 7, 8 are details and modifications of my improvements.

Similar letters of reference in each of the several figures indicate corresponding or similar parts.

My invention consists 1st in admitting steam upon the outer channeled circumference of the outer or main packing rings for the purposes hereinafter stated.

It consists 2nd in an arrangement of two or more valves, two or more sliding seats and two or more springs with relation to the piston head and follower and the packing rings.

It consists 3rd in constructing the inner ring with a channel in its outer circumference, and with a wedge shaped slit or cut in it and with a steam passage leading from its inner circumference into the channel, said steam passage being inclosed by a valve chamber, and the said wedge cut having a wedge fitted in it.

It consists 4th in an arrangement of a combined wedge and set bolt or its equivalent at the base of the piston head and with relation to the rings, so that the gravity of the piston upon the wedge tends to keep the packing distended and steam tight.

It consists 5th in the interposition of sliding spring wedges between the ends of the arms of the piston head and the inner circumference of the packing rings, so that compensation for wear of the packing rings shall automatically be made as fast as the wear takes place.

It consists 6th in the combination of the outer channeled ring or rings, intermediate smooth ring and inner channeled ring with a piston and the operative parts therein.

To enable others skilled in the art to make and use my invention I will proceed to describe its construction and operation with reference to the drawings.

To the termini of the arms of the piston A, Figs. 1, 2, and 3, T shaped slides B, are fitted by means of grooves $a$ in the arms; slots $b$, in the slides, and set screws $c$ passing through the slots into the arms, allowing the slides to play in the grooves but preventing their disconnection from the arms. The base of the slides is made wedging. So also is the surface with which said base comes in contact, in such manner that the slides move out from the arms or the center of the piston whenever they traverse in the grooves. At one end of each slide and between the piston head or follower a spring $d$ is arranged, and it tends to force the slide up the wedge base of the groove $a$, at all times and does do so whenever wear in the packing requires an expansion or distension of the rings to compensate for the reduced diameter of the packing.

Around the piston head in close contact with the broad ends of the T slides, a cut, perforated and channeled packing ring C, is arranged so as to fit snugly between the followers and present a good support to the same. The cut $e$, in this ring is of wedge shape and is located at the base of the piston head. The channel $f$, is in the outer circumference of the ring and may be about half the length of the ring; but this length must be between two end portions on opposite sides of the center, so that a steam tight wearing surface on both sides of the channel shall be maintained when another ring is made to encircle this ring. And the perforations $f^1$, extend from the inner surface of the ring into the channel $f$.

From the hub of the piston head a screw bolt D, extends downward and terminates in a wedge E, which fits and closes the cut $e$ of the ring C. The screw bolt is tapped in the hub of the piston head and has an adjusting nut $g$, fitted on it at a point outside of the hub, and by this construction the piston head is centered relatively to the axis of the cylinder of an engine, and when the piston is in use its gravity upon the wedge tends to distend the packing and hold it in that condition.

At a point directly above the axis of the piston head and in line with steam inlet passages $h$, $i$ and perforations $f'$, formed in the followers of the piston and in the ring C, an open ended cylindric chamber F, with discharge passage E', in its circumference, is formed on the inner surface of the ring C. Within this chamber two short cylindric seats G, G, are fitted so as to slide toward and from each other, steam tight. The bore of these seats is partly cylindric and partly conic, there being a square shoulder $j$, formed between the two differing portions of the bore of each seat by reason of the cylindric portion being of smaller diameter than the conic portion. These seats are kept apart and in place by means of a spring $j'$, which rests against the shoulders, $j$, $j$, as shown. And to each of the seats is adjusted a circular valve G' with a triangular shaped leg. These valves are kept in place and apart by means of another spiral spring $l$, which fits within the spring $j$, and around short stems $m$, $m$, which protrude from the backs of the valves as shown. By this arrangement the seats accommodate themselves to the adjustments imparted to the followers of the piston, and the valves control the admission of steam into the piston, and the chamber keeps the steam from the interior or central space of the piston, and insures its immediate escape into the channel of packing ring C, and into another channel presently described.

By having two valves constructed and arranged as shown one spring answers for both and one valve confines the steam while the other is admitting it in one direction of the piston, and when the piston reverses its movement the offices of the respective valves are reversed.

Around the outside of the ring C and its attachments, a cut ring H is placed, being ground so as to make an easy fit between the followers of the piston. This ring has a series of small passages $r$ cut through it from its inner to its outer circumference, said passages being over the channeled portion of the ring C. Both circumferences of the ring H, are plain—that is unchanneled.

Another ring I, made up of sections or two narrow rings I, formed of segments, are placed around the rings C and H, being ground so as to form an easy fit between the followers. These rings are free to expand or open where the segments join. They have segment channels J, cut in their outer circumference, and these channels lead by means of small apertures $o$ and the apertures $n$ into the channel of the packing ring. There are also recesses $p$ formed around the outer portion of the ends of these rings as shown. The segment sections are held together in any of the approved modes known in the art. By this arrangement a portion of the steam which enters through the valve passages into the channel of the ring C, circulates in the channels J, and relieves the packing rings I, of any undue pressure of the stream in the channel $f$, of ring C. This arangement also, by means of the spaces or recesses $p$, admits the steam which circulates outside the piston around the outer circumference of the followers, to act against the rings I, and press the rings together steam tight at $s$.

In Fig. 4, substantially the same arrangement as that described, is shown with the addition of a bridge K, on the inner ring C, and a jam nut $q$, on the adjusting bolt. Two additional adjusting nuts and screws $r$, $r$, are also provided at different points on the ring C. The ring H, instead of the ring C, is distended by the wedge E.

In Figs. 5, and 6, substantially the same arrangement of rings and piston head is shown, but the valves are placed in two separate steam chambers L, L, instead of in a single chamber, and two wedges M, E, are provided, one of which expands the ring C, by a spring and the other the ring H, by the gravity of the piston.

In Fig. 8, the same arrangement of rings and valves as is seen in Figs. 1, 2, and 4 is adopted, but the outer ring consists of four cylindrical sections, and all of the rings are cut and one wedge E answers for closing the openings of all, and keeping them steam tight, laterally, in a converse manner to that of the steam recesses $p$, shown in Figs. 1, 2, and 3 and 5.

My invention answers well for both upright and horizontal engines. In the former the wedge slides are used to greater advantage than in the latter, as they by their gravity and the action of the springs adjust themselves with certainty to the gradual wear of the packing, and thus tend to distend the rings in a manner to compensate for said wear. But in horizontal engines the wedge slides may be dispensed with and other modes of compensating for the wear adopted.

What I claim as my invention and desire to secure by Letters Patent, is—

1. While not claiming the admitting of steam between the cylinder and the circumference of the piston, I do claim employing through means substantially as described, the combination of the expanding action and compressing action of steam at one and the same time upon the ring or rings I of a piston, substantially as and for the purposes described.

2. The arrangement of the valves, their seats, their springs and their chambers with relation to the piston head and follower and the packing rings, for the purposes described.

3. The construction of the ring C substantially as and for the purpose described.

4. While not claiming the employment of three layers of packing irrespective of the construction of the same, I do claim the arrangement and combination of the packing rings C, H, I, the whole constructed in the manner and for the purpose described.

5. While not claiming a wedge for expanding packing, nor a screw and nut for regulating the spring of such wedge, I do claim the combination and arrangement of the wedge E, or its equivalent with the centering bolt or screw D, of the piston, substantially in the manner and for the purpose described.

6. The interposition of self adjusting wedges B, substantially in the manner and for the purposes described.

7. Adjusting the packing by means of wedges B, applied between it and the arms of the piston heads A, whether the wedges be operated automatically or otherwise, for the purpose set forth.

8. The spaces $p$, substantially as and for the purposes set forth.

D. R. FRASER.

Witnesses:
J. L. FARGO,
L. D. TURNER.